(12) United States Patent
Bent

(10) Patent No.: US 12,054,123 B1
(45) Date of Patent: Aug. 6, 2024

(54) MULTI-USE DISMOUNTABLE ROOF RACK

(71) Applicant: Andrew Scott Bent, Delta, CO (US)

(72) Inventor: Andrew Scott Bent, Delta, CO (US)

(73) Assignee: Andrew Scott Bent, Delta, CO (US)

( * ) Notice: Subject to any disclaimer, the term of this patent is extended or adjusted under 35 U.S.C. 154(b) by 125 days.

(21) Appl. No.: 17/881,583

(22) Filed: Aug. 4, 2022

Related U.S. Application Data

(60) Provisional application No. 63/197,074, filed on Jun. 4, 2021.

(51) Int. Cl.
  *B60R 9/058* (2006.01)
  *B60P 3/36* (2006.01)
  *B60R 9/045* (2006.01)

(52) U.S. Cl.
  CPC ............... *B60R 9/045* (2013.01); *B60P 3/36* (2013.01); *B60R 9/058* (2013.01)

(58) Field of Classification Search
  CPC ...................................................... B60R 9/058
  See application file for complete search history.

(56) References Cited

U.S. PATENT DOCUMENTS

| | | | | |
|---|---|---|---|---|
| 1,456,918 A * | 5/1923 | Dudley | ................... | E04H 15/00 135/153 |
| 3,254,657 A * | 6/1966 | Reger | ..................... | E04H 15/06 135/156 |
| 3,845,775 A * | 11/1974 | Norris | ..................... | E04H 15/06 D21/834 |
| 3,861,572 A * | 1/1975 | Norris | ..................... | B60P 3/38 135/153 |
| 5,280,801 A * | 1/1994 | Brosman | .................. | B60P 3/34 135/141 |
| 6,209,944 B1 * | 4/2001 | Billiu | ..................... | B60J 7/1614 296/159 |
| 6,832,798 B1 * | 12/2004 | Krause | ..................... | B60R 9/00 224/403 |
| 9,016,750 B2 * | 4/2015 | Izydorek | ................ | B60R 9/055 296/37.6 |
| 9,499,999 B2 * | 11/2016 | Zhou | ...................... | E04H 15/008 |
| 9,567,767 B2 * | 2/2017 | Kendrick | ............... | E04H 15/06 |
| 9,580,928 B1 * | 2/2017 | Currid | .................... | E04H 15/56 |
| 10,125,517 B2 * | 11/2018 | Xu | ......................... | B60P 3/34 |
| 10,406,987 B1 * | 9/2019 | Lester | ................... | B60R 9/042 |
| 10,543,771 B2 * | 1/2020 | Sautter | ................... | B60P 3/34 |
| 11,639,612 B1 * | 5/2023 | Florez | .................... | E04H 15/48 135/88.07 |
| 2007/0140808 A1 * | 6/2007 | Peng | ........................ | B60R 9/04 410/156 |
| 2013/0001267 A1 * | 1/2013 | Infantino | ............... | B60R 9/045 224/539 |
| 2016/0031354 A1 * | 2/2016 | Miles | ..................... | B60P 1/4414 211/1.51 |
| 2017/0144609 A1 * | 5/2017 | Poudrier | ................ | B60R 9/045 |
| 2019/0009729 A1 * | 1/2019 | Mercurio | ............... | B60R 9/042 |
| 2020/0062188 A1 * | 2/2020 | Boyle | .................... | B60R 9/042 |
| 2020/0384837 A1 * | 12/2020 | Singer | .................... | B60J 7/141 |
| 2021/0370751 A1 * | 12/2021 | Schafer, Jr. | ............. | B60R 9/058 |
| 2022/0017018 A1 * | 1/2022 | Perkins | .................. | E04H 15/06 |

(Continued)

*Primary Examiner* — Brian D Nash
(74) *Attorney, Agent, or Firm* — Plager Schack LLP; Mark H. Plager; Naomi Mann

(57) ABSTRACT

Disclosed is a multi-use dismountable roof rack which is convertible into a free-standing structure and may be easily mounted to and removed from the roof of a vehicle.

6 Claims, 6 Drawing Sheets

(56) References Cited

U.S. PATENT DOCUMENTS

2022/0162879 A1\* 5/2022 Davis .................... E04H 15/008
2023/0256913 A1\* 8/2023 Manion .................. B60R 9/048
                                                          224/310

\* cited by examiner

MULTI-USE DISMOUNTABLE ROOF RACK

RELATED APPLICATION

This application claims benefit to U.S. Provisional Application No. 63/197,074 filed Jun. 4, 2021, which is incorporated by reference herein in its entirety.

BACKGROUND

The present disclosure relates generally to vehicle roof racks.

A conventional roof rack may generally comprise a barred structure secured to the roof of a motor car, and its use is limited to attachment of bulky items such as luggage, bicycles, canoes, kayaks, skis, or various carriers and containers. As such, roof rack with added functionality would be desirable.

SUMMARY

According to various embodiments, disclosed is a roof rack configured to mount and be removed from a vehicle roof top, the roof rack comprising: a roof rack basket; and a plurality of legs pivotally coupled to the roof rack basket, wherein the legs are configured to switch between a folded position and an extended position, wherein in the folded position, the legs align with side edges of the roof rack basket, and wherein in the extended position, the legs are configured to support the roof rack basket in a freestanding position on a surface.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
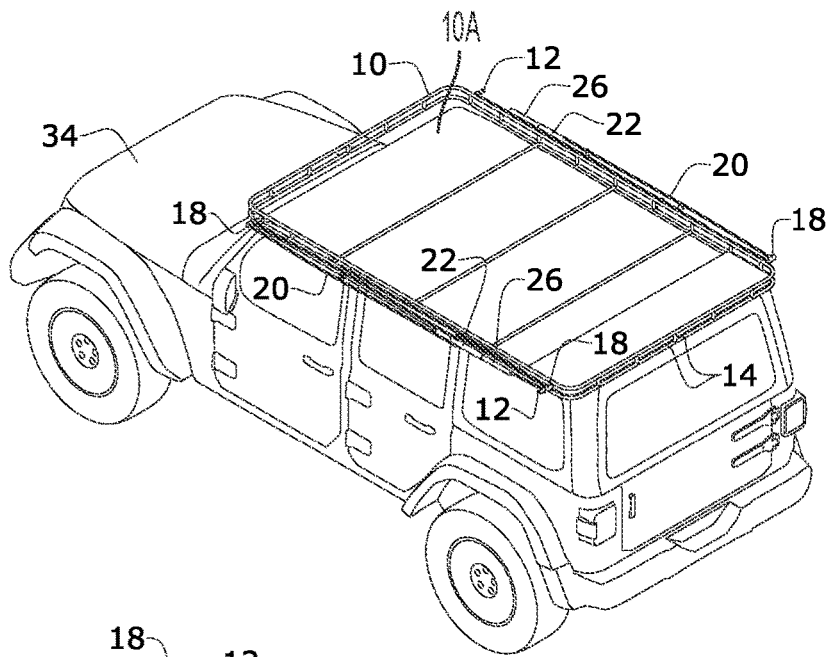
FIG. 1 is a perspective view of a roof rack shown attached to the roof of a vehicle with the legs of the roof rack in a folded position, according to certain embodiments.
Figure 2:
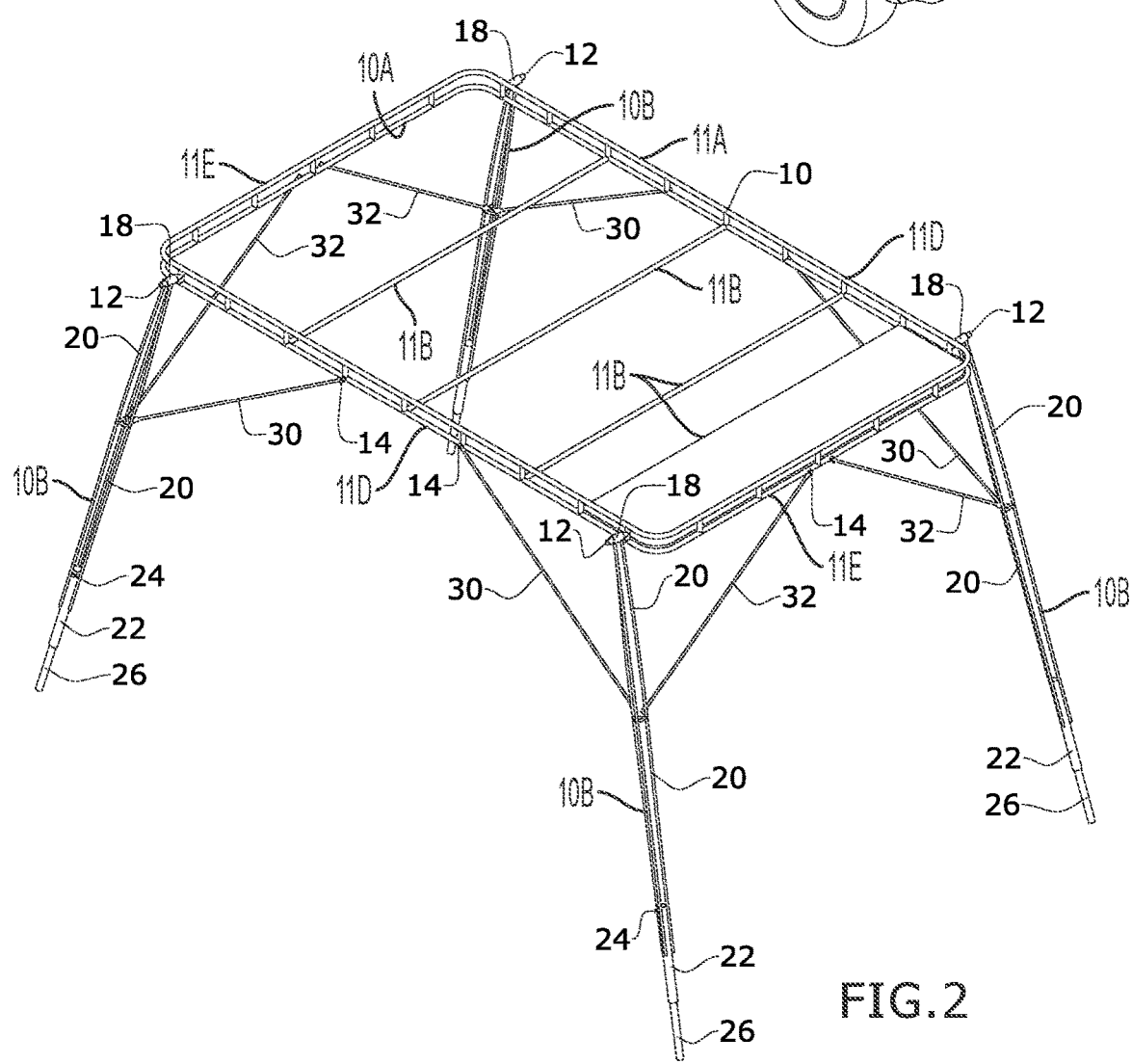
FIG. 2 is a perspective view of the roof rack removed from the vehicle and with the legs in an open position.
Figure 3:
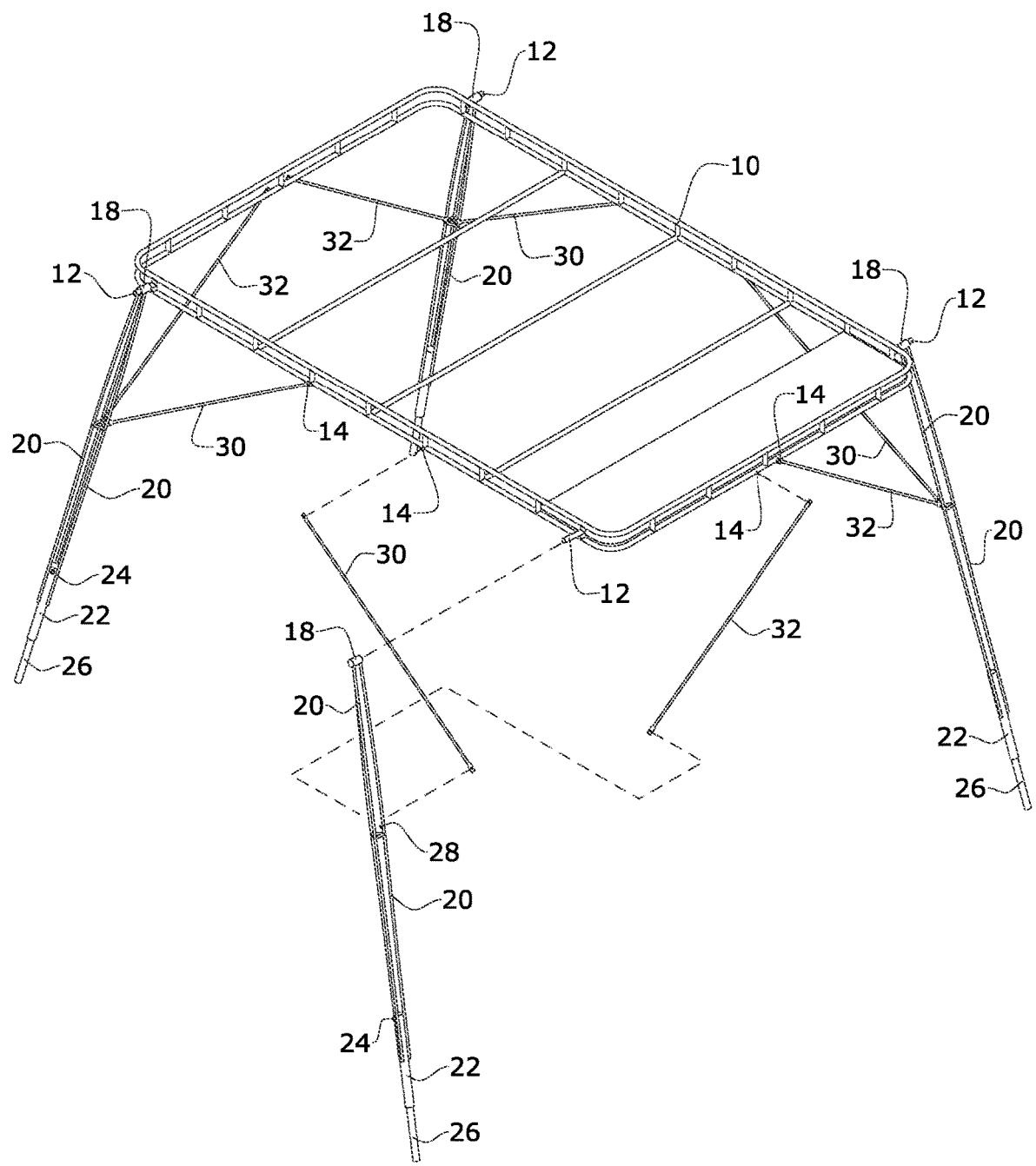
FIG. 3 is an exploded view of the roof rack.
Figure 4:
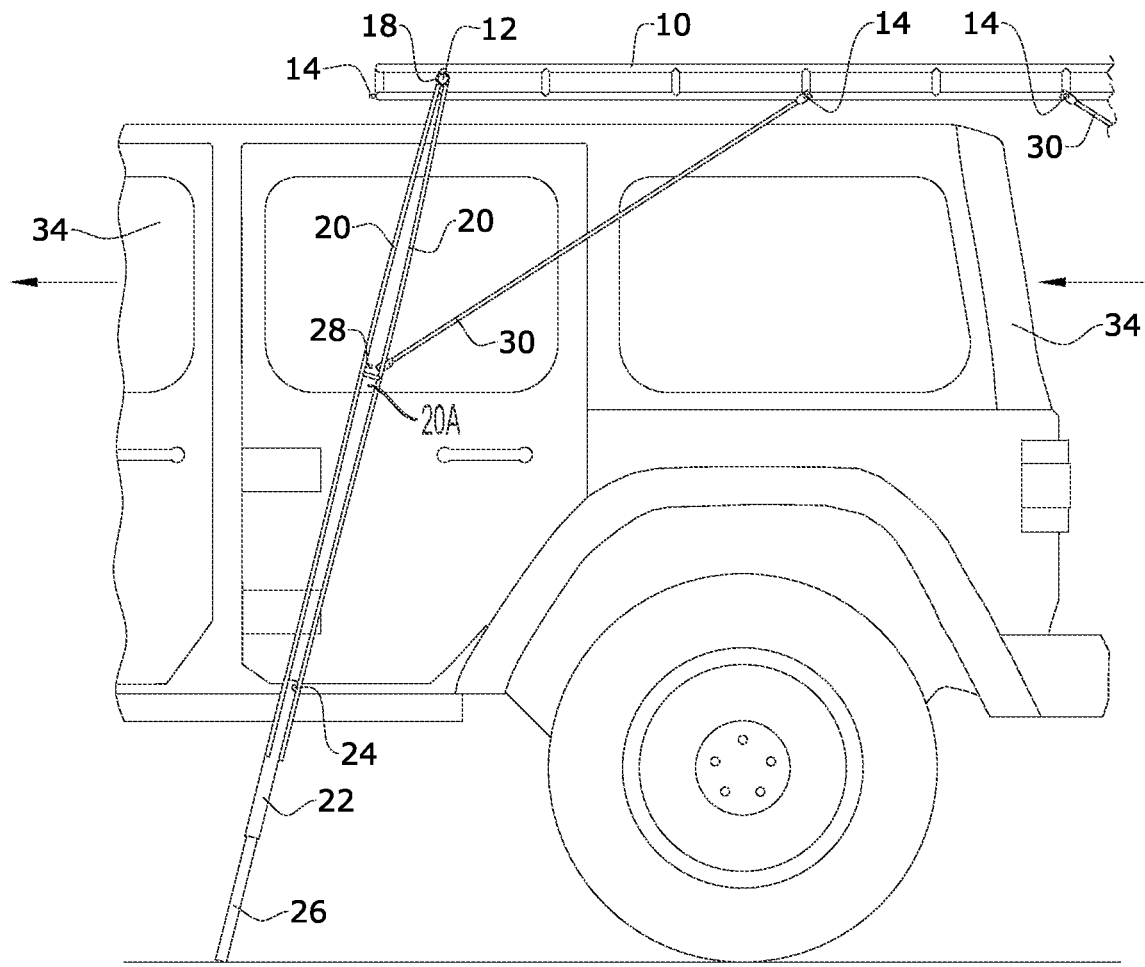
FIG. 4 is an enlarged detailed view of the roof rack.
Figure 5:
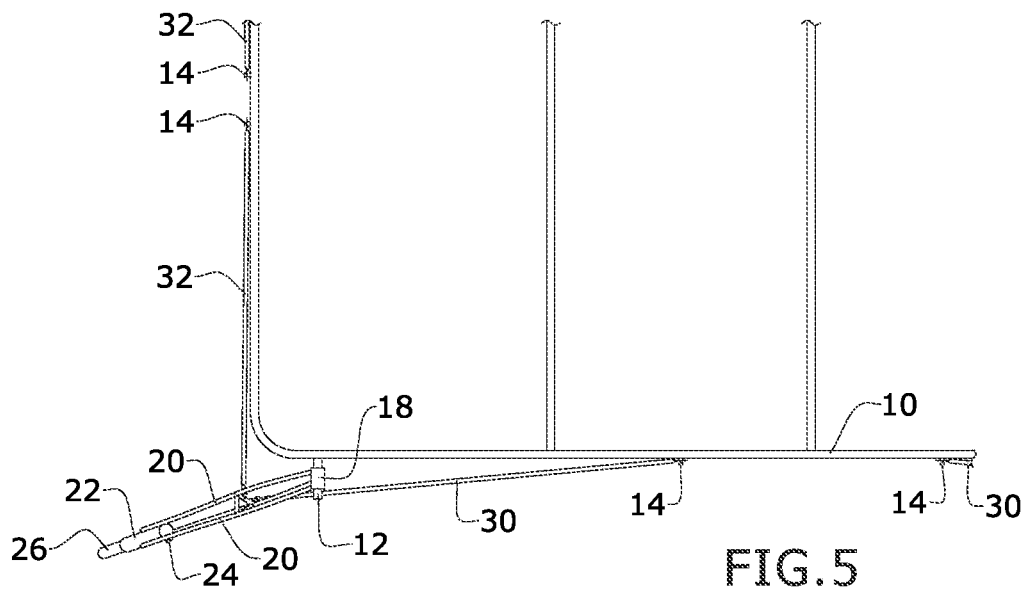
FIG. 5 is a partial side view of the roof rack.
Figure 6:
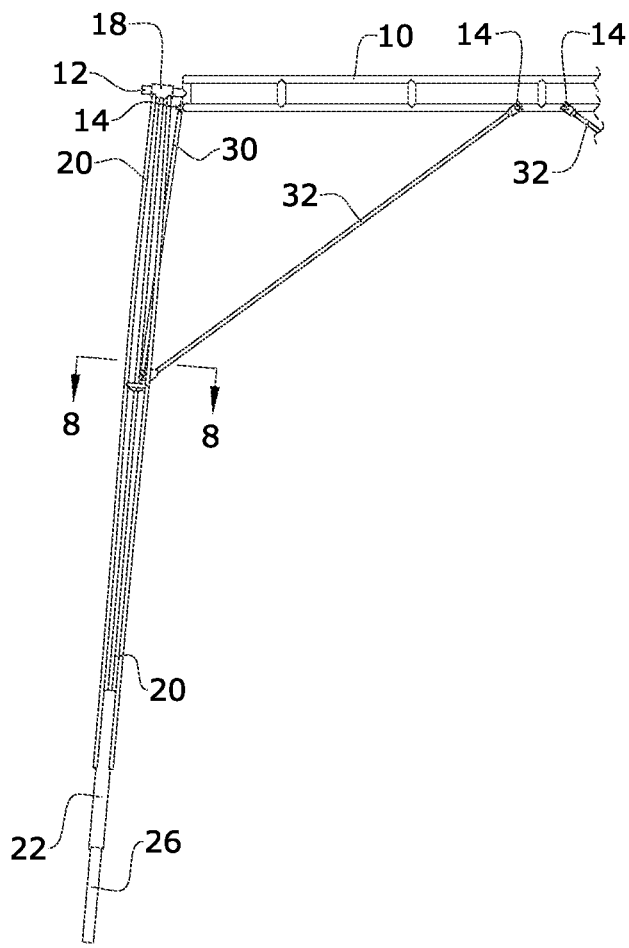
FIG. 6 is a partial top view of the roof rack.
Figure 7:
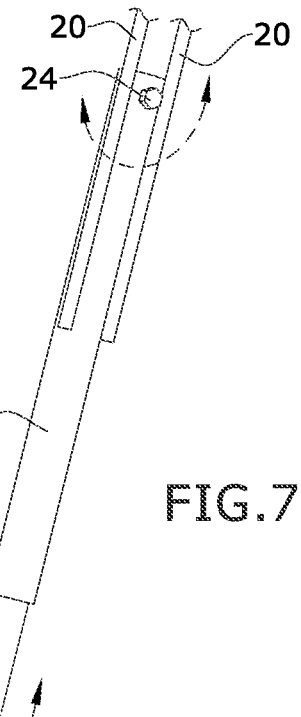
FIG. 7 is a partial end view of the roof rack.
Figure 8:
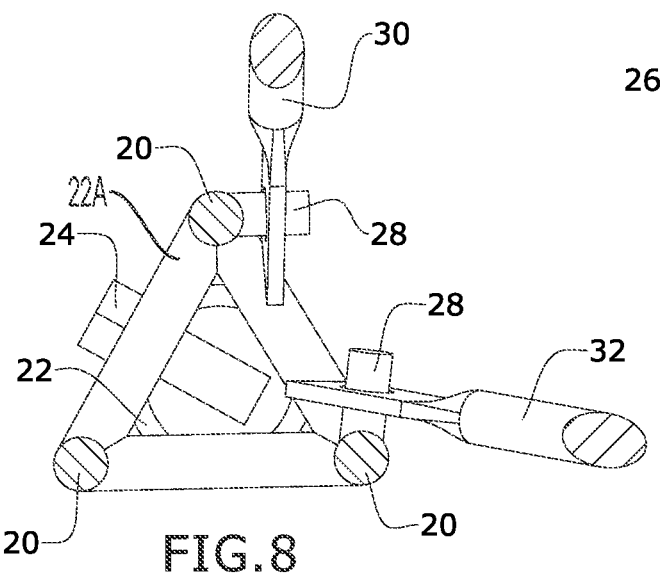
FIG. 8 is a section view taken along line 8-8 from FIG. 6.

According to various embodiments, as depicted in FIGS. 1-9, disclosed is a multi-use dismountable roof rack 10 which is convertible into a free-standing structure, and may be easily mounted to and removed from the roof of a vehicle 34.

In embodiments, roof rack 10 may generally comprise a roof rack basket 10A and a plurality of foldable legs 10B coupled to roof rack basket 10A. In certain embodiments, roof rack basket 10A may comprise a rail structure including a rail frame 11A to which legs 10B are rotationally coupled. Roof rack basket 10 may further comprise cross rails 11B extending between opposite sides of rail frame 11A. In some embodiments, a user may place one or more sheets on cross rails 11B. The sheet(s) may be made of a rigid material such as wood, plastic, and the like. In other embodiments, the sheet(s) may be made of a flexible material, such as canvas or other cloth. The sheet(s) may function as a platform on which items may be supported and/or as a canopy shade when roof rack 10 is freestanding.

In certain embodiments, roof rack 10 may comprise four legs 10B. Roof rack basket 10A may have a rectangular geometry wherein each leg 10B may be rotationally coupled to the long sides 11D of rail frame 11A proximate the corners of the frame, as shown in the figures. In some embodiments, each of the legs 10B may switch between a folded position and an extended position. In the folded position, each leg 10B aligns with a side of rail frame 11A, permitting roof rack 10 to be mounted to the roof of vehicle 34. In the extended position, each leg 10B extends vertically, (i.e., substantially perpendicular or slightly obtuse to roof rack basket 10A), such that the extended legs 10B may support roof rack basket 10A on the ground or other surface.

In one embodiment, a peg 12 may be provided at each of the four the coupling sites of the legs. A leg pivot head socket 18 may be coupled proximate a top end of each leg 10B and may rotationally engage with peg 12 to connect the leg to the rail frame in a manner which enables leg 10B to pivot with respect to roof rack basket 10A. As such, legs 10B are configured to switch between the folded position and the extended position.

In certain embodiments, each leg 10B may comprise a top leg segment 20. In some embodiments, each leg 10B may further comprise a height adjustable leg segment 22 coupled to a bottom portion of top leg segment 20. Each height adjustable leg segment 22 may comprise a telescoping leg segment 26 coupled to a bottom portion of adjustable leg segment 22. Telescoping leg segment may be pushed out of leg segment 22 to extend the length of leg segment 22, or pushed into leg segment 22 to shorten the length of leg segment 22.

In some embodiments, top leg segment 20 may be secured to adjustable leg segment 22 via an adjustment knob 24. In certain embodiments, the combined lengths of top leg segment 20 and adjustable leg segment 22 may be shorter than long sides 11D of rail frame 11A. In one embodiment, top leg segment 20 may comprise three rods which are aligned to form a triangular tube frame. This provides for a strong and lightweight structure. In some embodiments, a triangular brace 20A may be provided for structural reinforcement of the frame. It shall be appreciated that in alternate embodiments, top leg segment 20 may have a different configuration, such as a straight rod. In certain embodiments, adjustable leg segment 22 may be engaged within a lower end portion of the triangular frame and secured via an adjustment knob 24. Adjustable leg segment 22 may be a tube wherein telescoping leg segment 26 may be captured within a lower part of the tube, and is configured to slide in and out of adjustable leg segment 22 in order to level and/or adjust the height of roof rack basket 10A.

In certain embodiments, roof rack 10 may further comprise support rods including long side diagonal braces 30 and short side diagonal braces 32, which may be attached to the roof rack in its freestanding position and removed when the roof rack is folded. Long side diagonal braces 30 may extend from a leg attachment point 28 at an intermediate section of each top leg segment 20 to a rail frame attachment point 14 at an intermediate section of long side 11D. Short side diagonal braces 32 may extend from leg attachment point 28 of each top leg segment 20 to a rail frame attachment point 14 at an intermediate section of a short side 11E of rail frame 11A. In one embodiment, each of long side diagonal braces 30 and short side diagonal braces 32 may comprise holes at their opposite ends configured to engage pins at each leg attachment point 28 and rail frame attachment point 14.

Figure 9:
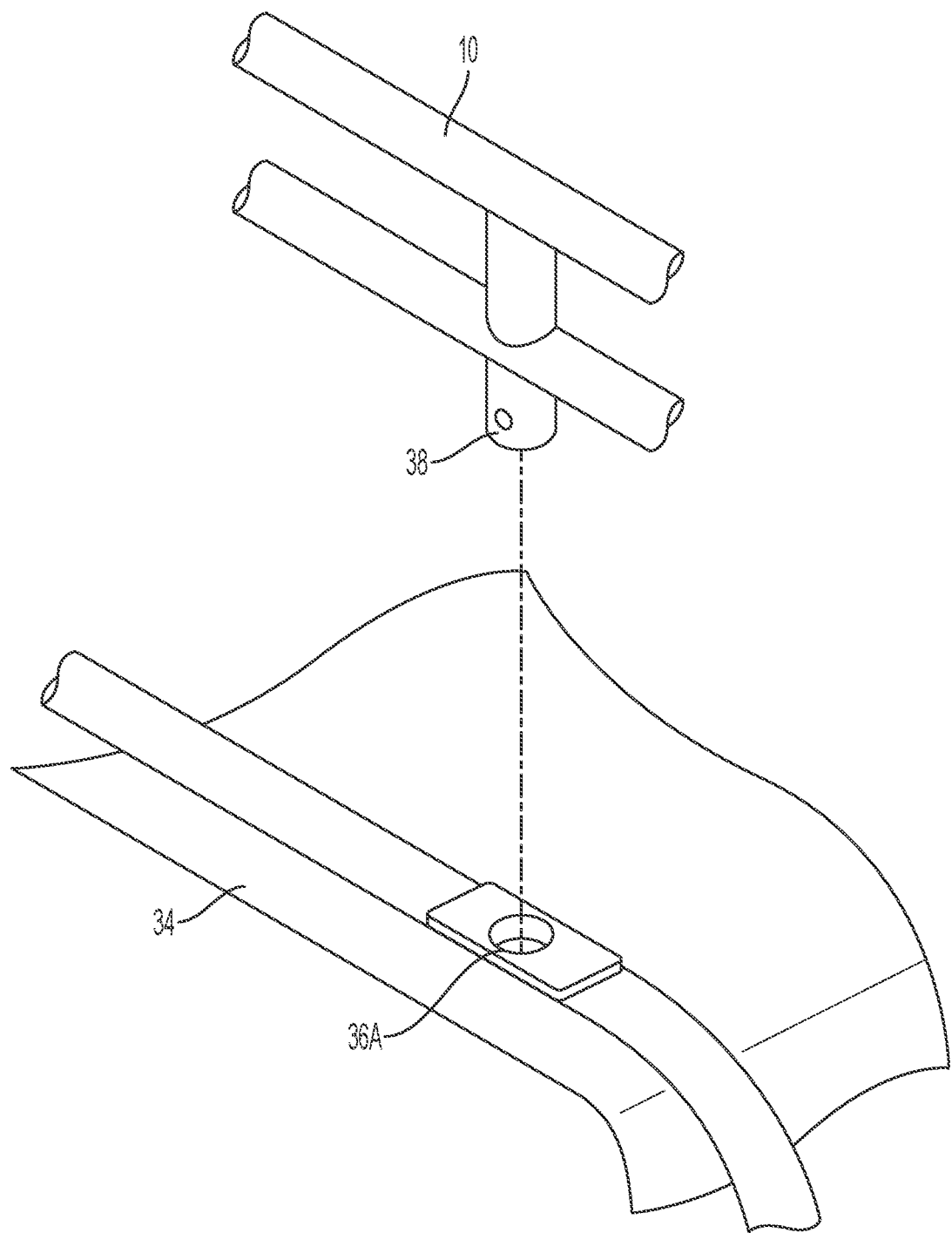
FIG. 9 is a detailed view of the connection between the roof rack and roof rack connection bars, according to various embodiments.
Figure 10:
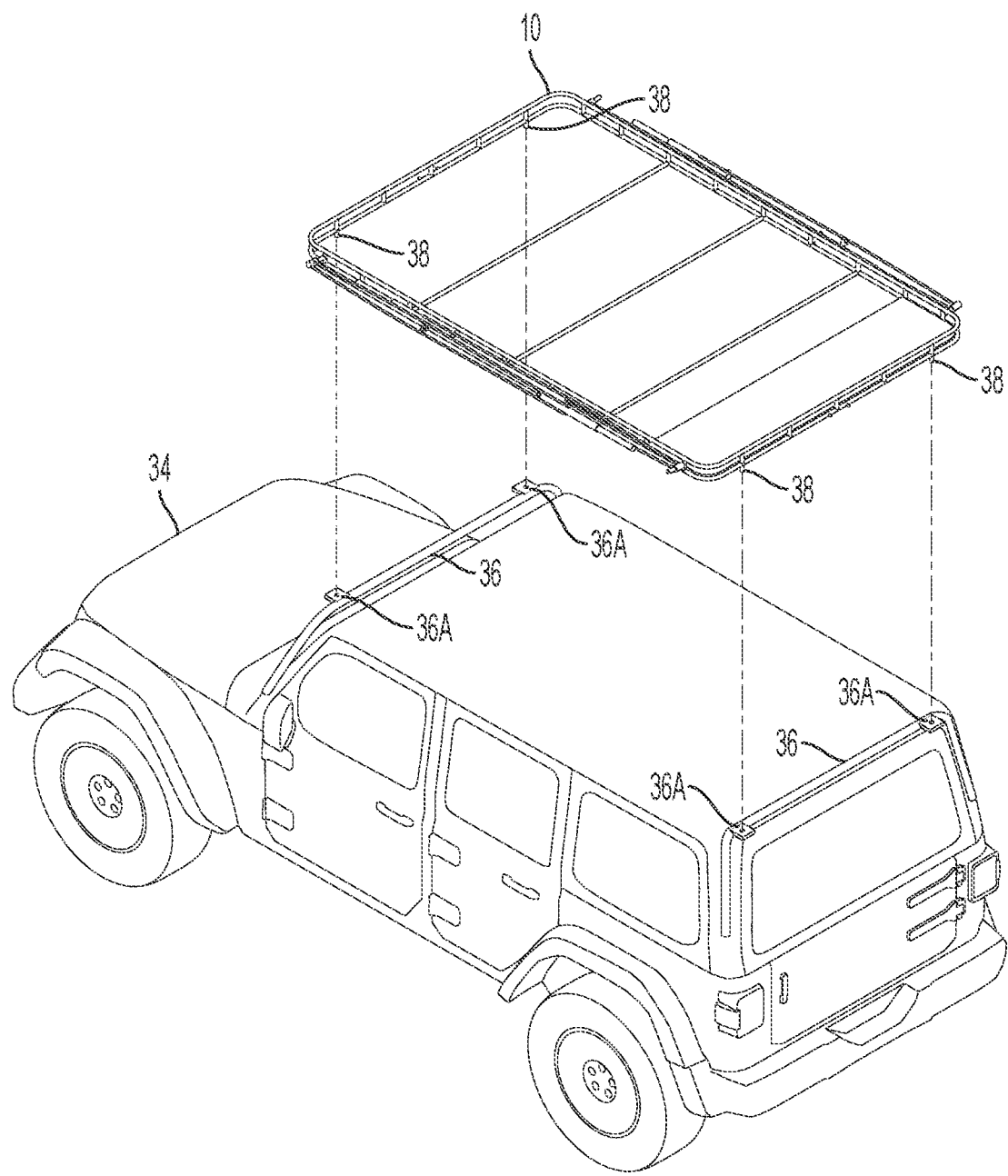
FIG. 10 shows the connection of the roof rack to the roof rack connection bars of a vehicle, according to various embodiments.

In certain embodiments as depicted in FIGS. 9 and 10, roof rack 10 may be attachable to the roof of vehicle 34 via connection bars 36 which are permanently fixed to the roof. Each connection bar 36 may include a horizontal portion comprising slots 36A configured to receive pegs 38 attached to the bottom of roof rack 10. Each connection bar 36 may further include side vertical portions which elevate the horizontal portion. In some embodiments, connection bars 36 may comprise a front connection bar and a rear connection bar. Additionally, each connection bar may include two slots 36A, wherein slots 36A on the front connection bar receive two pegs 38 proximate a front end of roof rack 10, and slots 36A on the rear connection bar receive two pegs 38 proximate a back end of roof rack 10. As such, roof rack 10 may be attached to bars 36 by lowering the roof rack onto the vehicle's roof so that pegs 38 insert into slots 36A of the roof rack bars. In some further embodiments, pegs 38 may comprise side holes configured to situate below the horizontal portion of each of the connection bars, wherein bolts or pegs may be inserted horizontally through the holes to secure the roof rack to connection bars 36.

As such, roof rack 10 may easily be removed by raising it with respect to the vehicle's roof, so that pegs 38 slide out of slots 36A. In certain embodiments, a user may need to remove the bolts/pegs which are inserted through the side holes prior to raising the roof rack. In some further embodiments, legs 10B of the roof rack may be unfolded and angled towards the ground, wherein telescoping leg segment 26 may be extended until they push up off the ground to lift the roof rack out of the connection bars. As such, telescoping leg segments 26 may function as lifts or jacks which help dismount the roof rack. It shall be appreciated that different mechanisms for attachment of the roof rack to the vehicle's rooftop may be provided in alternate embodiments.

As such, the disclosed roof rack 10 may easily mount to the roof of a vehicle and be detached without hardware which is difficult to remove. When on the roof of the vehicle, roof rack 10 may be used for carrying various cargo items. When removed, roof rack 10 may be used as a shade canopy, but may also be used to support and store items within the basket of the roof rack. As such, the roof rack may be used for various activities including but not limited to outdoor recreation (e.g., sports, camping, picnicking, etc.), outdoor work (e.g., construction), military activity, and medical applications, etc.

It shall be appreciated that the disclosed roof rack can have multiple configurations in different embodiments. For example, braces 30, 32, may be replaced with a locking mechanism or lift supports in alternate embodiments. As another example, legs 10B may swing mount or telescope from different locations of the roof rack basket. As a further example, roof rack basket 10A may be a planar structure, wherein frame 11A of roof rack basket 10A may be entirely coplanar with cross rails 11B, rather than extending vertically upwards.

It shall be appreciated that the components of roof rack 10 described in several embodiments herein may comprise any alternative known materials in the field and be of any size and/or dimensions. It shall be appreciated that the components of roof rack 10 described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A roof rack configured to mount and be removed from a vehicle roof top, the roof rack comprising:
   a roof rack basket;
   a plurality of legs pivotally coupled to the roof rack basket,
      wherein the legs are configured to switch between a folded position and an extended position,
      wherein in the folded position, the legs align with side edges of the roof rack basket, and
      wherein in the extended position, the legs are configured to support the roof rack basket in a freestanding position on a surface,
      wherein the roof rack basket comprises a rail frame to which the legs are rotationally coupled, and cross rails extending between opposite sides of the rail frame; and
   the roof rack further comprising a plurality of diagonal braces, wherein each of the plurality of diagonal braces is configured to attach between an intermediate section of a leg and an intermediate section of the rail frame when the roof rack basket is in a freestanding position.

2. The roof rack of claim 1, further comprising pegs extending downwards from a bottom side of the roof rack basket, the pegs configured to insert into slots within connection bars that are fixed to the vehicle roof top,
   wherein the roof rack is removable from the vehicle roof top by lifting the roof rack to slide the pegs out of the slots, and
   wherein the roof rack is attachable to the vehicle roof top by lowering the roof rack to insert the pegs into the slots.

3. The roof rack of claim 2, wherein each leg comprises a telescoping leg segment configured to extend the height of the leg.

4. The roof rack of claim 3, wherein the telescoping leg segment is further configured to push against the surface to lift the roof rack from the vehicle roof top.

5. A roof rack method, comprising:
   a) providing a roof rack comprising:
      a roof rack basket, a plurality of legs pivotally coupled to the roof rack basket, and pegs extending downwards from a bottom side of the roof rack basket, wherein the legs are configured to switch between a folded position and an extended position, wherein in the folded position, the legs align with side edges of the roof rack basket, and wherein in the extended position, the legs are configured to support the roof rack basket in a freestanding position on a surface, wherein the roof rack basket comprises a rail frame to which the legs are rotationally coupled, and cross rails extending between opposite sides of the rail frame; and the roof rack further comprising a plurality of diagonal braces, wherein each of the plurality of diagonal braces is configured to attach between an intermediate section of a leg and an intermediate section of the rail frame when the roof rack basket is in a freestanding position; and b) attaching the roof rack to connection bars that are permanently affixed to a roof top of a vehicle by inserting the pegs into slots within the connection bars.

6. The roof rack method of claim 5, further comprising removing the roof rack from the connection bars by lifting the roof rack to slide the pegs out of the slots within the connection bars, wherein lifting the roof rack comprises extending the legs and further extending a telescoping portion in each of the legs such that the telescoping portion pushes against a ground surface to lift the roof rack with respect to the vehicle roof top.

\* \* \* \* \*